United States Patent [19]

Natwig et al.

[11] 4,012,482
[45] Mar. 15, 1977

[54] SCRUBBING OF AMMONIA FROM OXIME LIQUID ION EXCHANGE REAGENTS

[75] Inventors: David L. Natwig, Brighton, Mass.; Roald R. Skarbo, Lokken Verk, Norway

[73] Assignee: Kennecott Copper Corporation, New York, N.Y.

[22] Filed: July 21, 1975

[21] Appl. No.: 597,550

[52] U.S. Cl. .................................. 423/24; 423/139
[51] Int. Cl.[2] ................... C01G 3/00; C01G 51/00; C01G 53/00
[58] Field of Search ......... 423/24, 139; 75/101 BE, 75/117, 119

[56] References Cited
UNITED STATES PATENTS

| | | | |
|---|---|---|---|
| 3,761,249 | 9/1973 | Ritcey et al. | 423/24 X |
| 3,794,719 | 2/1974 | Lowenhaupt et al. | 423/139 X |
| 3,853,725 | 12/1974 | Skarbo | 423/24 X |
| 3,855,090 | 12/1974 | Skarbo | 423/139 X |

Primary Examiner—Oscar R. Vertiz
Assistant Examiner—Brian E. Hearn
Attorney, Agent, or Firm—John L. Sniado; Lowell H. McCarter; Anthony M. Lorusso

[57] ABSTRACT

A process for scrubbing extracted ammonia from oximes. The process is particularly adaptable as a secondary scrub, prior to acid stripping, in a process in which metals are recovered from ammoniacal leach liquors by solvent extraction. The present process eliminates the pH rise of the aqueous scrub liquor associated with acid scrubbing of ammonia from oximes into which ammonia has been extracted. Extractable metal sulfates are utilized in an aqueous scrub solution at a pH <7. The net result is an exchange of ammonia on the oxime for copper or nickel in the scrub solution with resulting loading of copper or nickel by the oxime and the formation of ammonium sulfate in the aqueous scrub solution with no change in the pH of the aqueous scrub solution.

16 Claims, 3 Drawing Figures

SCRUBBING OF AMMONIA FROM OXIME LIQUID ION EXCHANGE REAGENTS

BACKGROUND OF THE INVENTION

This invention relates to a process for removing ammonia from organic solutions of an oxime-metal chelate prior to treating the solution to remove the metal therefrom.

In U.S. Pat. No. 3,853,725, entitled "Selective Stripping Process"; U.S. Pat. No. 3,855,090, entitled "Process for Recovering Nickel Selectively"; and, copending application Ser. No. 266,986, entitled "Selective Solvent Extraction Process"; all filed on June 28, 1972, various processes are described for recovering nickel or copper from aqueous ammoniacal leach solutions. In these processes, an ore containing copper and/or nickel is contacted with an aqueous ammoniacal solution, generally ammonia-ammonium carbonate having a pH above about 9, to form an aqueous solution of these metals. The copper and/or nickel contained in the aqueous metal-rich solution is chelated with an oxime in a solvent extraction step. The chelate is stripped with an aqueous acid solution to transfer the metal from the oxime to the acid solution; and, the metal-rich stripping solutions are treated by electrowinning to recover pure nickel and copper.

In one process, separation of nickel and copper is achieved in the solvent extraction step. In an alternative process, selective separation of nickel and copper is affected in a stripping step following coextraction of nickel and copper from an aqueous ammoniacal solution with an organic oxime solution. In this latter process, which is shown schematically in FIG. 1, in the nickel strip stage 10, hydrogen ion in the aqueous solution is exchanged selectively for nickel ion in the oxime. A copper-rich oxime solution recovered from this acid nickel stripping stage is contacted with an aqueous acid solution in a separate copper stripping stage 12 wherein the copper ion in the oxime solution and hydrogen ion in the aqueous acid solution are exchanged. The nickel-rich aqueous solution and the copper-rich aqueous solution, recovered from each of these stripping steps, are then treated by electrowinning in separate steps to obtain pure nickel and copper metal.

When oximes are used to extract metal values from ammoniacal leach solutions, some ammonia is transferred from the original ammoniacal leach solution to the oxime. Furthermore, essentially all of the ammonia extracted by the oxime is transferred to the acid aqueous stripping solutions. This transfer results in substantial reagent losses and formation of ammonium salts which must be removed from the process. The formation of the ammonium salts in the stripping step is particularly undesirable in the case of nickel stripping since it results in the precipitation of nickel as $NiSO_4 \cdot (NH_4)_2 SO_4$. Indeed, in order to render extraction processes attractive, from a commercial standpoint, it is necessary that any ammonia be removed from the organic oxime solution prior to the stripping steps.

In U.S. patent application Ser. No. 317,003 now abandoned in favor of Ser. No. 610,935, entitled "Process for Removing Ammonia from Solutions of Oxime-Metal Chelates" by Skarbo et al, filed on Dec. 20, 1972, the teachings of which are incorporated herein by reference, a process for removing ammonia from oxime-metal chelates is disclosed. The process comprises countercurrently contacting the organic oxime with an aqueous solution stream 11 containing an agent such as ammonium carbonate, ammonium bicarbonate, alkaline metal bicarbonate or mixtures of the foregoing agents in a first scrub stage 14. As a result of contacting the oxime, which may contain extracted ammonia, with the foregoing agent in the primary scrub stage 14, a large portion of the extracted ammonia is removed from the oxime. The ammonia-depleted organic oxime leaving primary scrub stage 14 can be treated in the secondary scrub stage 16 to remove additional ammonia prior to recovering metals therefrom. A typical method of removing residual ammonia in the secondary scrub stage 16, is to contact the oxime with an aqueous solution of sulfuric acid. In secondary scrub stage 16 of the prior art procedure, a recycled solution stream 18 containing 100 g/l $(NH_4)_2SO_4$ and $H_2SO_4$ at a pH of 3-4 is used to scrub the last 50-100 ppm $NH_3$ from the metal loaded organic phase. At an O/A ratio = 1.0, this amount of $NH_3$ scrubbed from the organic is enough to neutralize the acid in the aqueous scrub solution causing the pH to rise from 3-4 up to $\approx 6$. Consequently, continuous addition of $H_2SO_4$ to maintain a pH of 3-4 in the recycle scrub solution 18 is required. Thus:

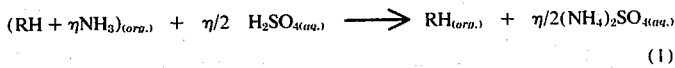

(1)

SUMMARY OF THE INVENTION

In the present invention, divalent copper or nickel ions are added to the recycle scrub solution instead of hydrogen ions to scrub ammonia from a metal-loaded oxime solution. If an amount of metal is added which is equivalent to the amount of $NH_3$ to be scrubbed from the organic, the net result is an unchanged aqueous pH. Thus:

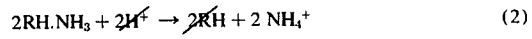 (2)

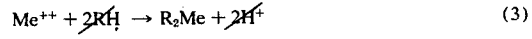 (3)

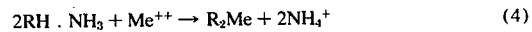 (4)

The overall reactions which occur when ammonia is scrubbed from metal-loaded oximes in accordance with the present invention is illustrated in equation (2), (3), and (4). In these equations, the ammonia to be scrubbed is shown to be complexed with the oxime as "$RH \cdot NH_3$". It should be noted, however, that this notation is for illustrative purposes only. Indeed it is not known whether or not a well defined stoichiometry exists between RH and $NH_3$ nor whether there is a compound formation between the ammonia and the oxime. Furthermore, it should be noted that the present invention is directed to scrubbing ammonia from a metal-loaded oxime solution. Equations (2), (3), and (4), of course, do illustrate why the pH of the scrub solution remains constant when the present invention is followed.

There are two reasons why constant pH is desirable. First of all, $NH_3$ scrubbing is improved at constant pH's. Secondly, any practical O/A ratio can be used when the pH of the scrub solutions remains constant thereby enabling optimization of equipment size.

In connection with the advantages of scrubbing $NH_3$ at constant pH's, it should be noted that when $Cr^{++}$ ions are used to scrub $NH_3$ from oximes, such scrubbing is most advantageous when performed at pH's between 3–4. On the other hand, in order to exchange $Ni^{++}$ ions in the aqueous scrub solution for $NH_3$ on the oxime, it is advantageous to perform the exchange when the pH of the scrub solution is constantly in the pH ≈ 6 range.

Because the present invention allows the pH of the scrub solution to be maintained at a constant value, the present process can be utilized to recover metals from bleed streams. Thus, another important aspect of the present invention utilizes the pH rise of aqueous ammonia-scrub streams to extract and recover small amounts of metal values such as nickel that are extractable at a pH of about 6 and which are obtainable from electrolyte bleed streams.

Accordingly, it is an object of the present invention to provide a process for scrubbing ammonia from an oxime in which the pH of the scrub solution remains essentially constant.

A further object of the present invention is to provide a secondary scrub stage in which ammonia on an oxime is removed therefrom with a reduction in the amount of acid consumed to remove the ammonia.

A further object of the invention is to remove $NH_3$ from an oxime while simultaneously recovering small amounts of metal such as are obtained from electrolyte bleed streams.

A further object of the invention is to provide an ammonia scrubbing process allowing flexibility in selecting an O/A ratio enabling minimization of equipment size.

DESCRIPTION OF THE PREFERRED EMBODIMENTS

At the outset, the process of the present invention is described in its broadest overall aspects with a more detailed description following. The present invention is a process for scrubbing ammonia from an organic oxime stream into which metal values have been extracted and which also contains ammonia. Ammonia scrubbing in accordance with one important embodiment of the present invention utilizes an aqueous solution of ammonium sulfate at an approximate pH of 3–6 to scrub the ammonia from the oxime stream into which it is loaded. To maintain constant pH, an amount of metal such as copper, in amounts equivalent to the ammonia on the oxime, is included in the scrubbing stage as a metal sulfate or other salt. The net results of the reactions which occur in the scrubbing stage in accordance with the present invention is the removal of ammonia from the oxime, the formation of ammonium sulfate, and the extraction of the metal added as a sulfate by the oxime. The method of the present invention has an advantage in that an essentially constant pH can be maintained during the scrubbing, thereby improving the scrubbing efficiency and allowing greater flexibility in selecting a desirable organic to aqueous ratio (O/A).

The process of the present invention is broadly applicable to scrubbing ammonia from oximes onto which ammonia has been extracted. The process, however, has particular applicability as a secondary scrub for use in conjunction with the process set forth in U.S. patent application Ser. No. 317,003 entitled Process for Removing Ammonia from Solutions of Oxime-Metal Chelates by Roald R. Skarbo et al.

Figure 1:
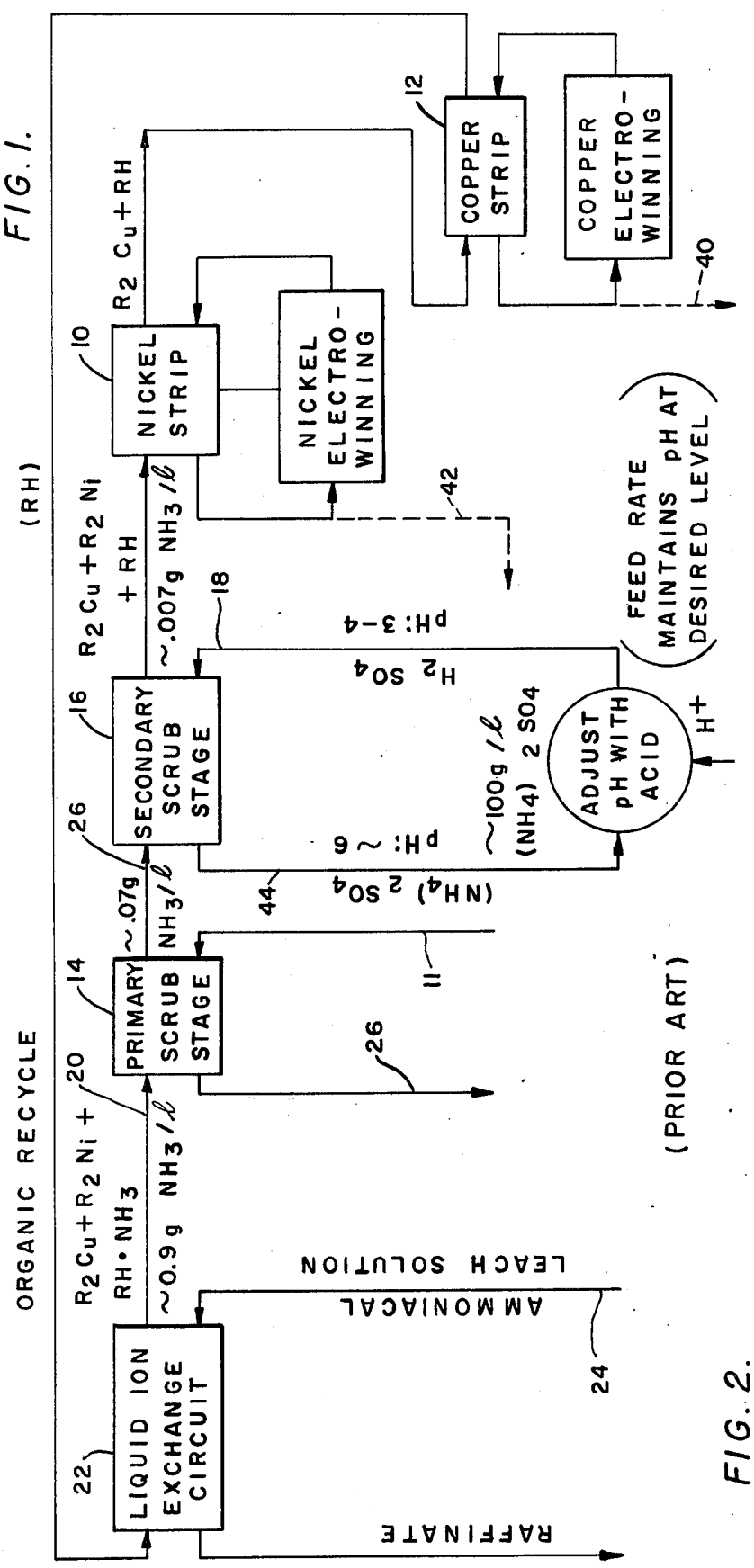
FIG. 1 is a schematic diagram illustrating a prior art method for scrubbing ammonia from oximes.
Figure 2:
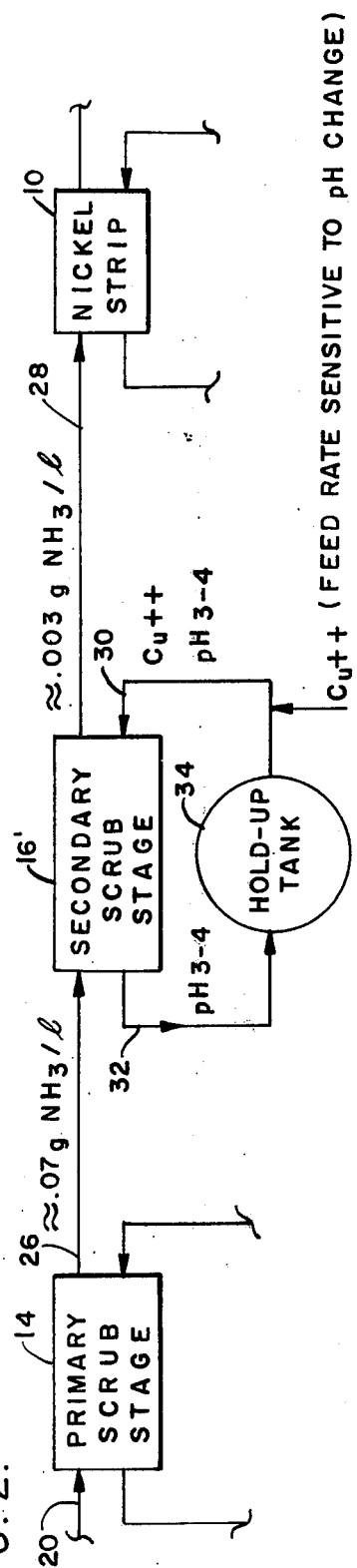
FIG. 2 is a schematic diagram illustrating a process similar to the process shown in FIG. 1, but containing a secondary scrub circuit in accordance with the present invention.

In the process shown schematically in FIGS. 1 and 2, copper and nickel are co-extracted by an oxime, with the nickel being selectively stripped from the co-loaded oxime in accordance with the process set forth in U.S. Pat. No. 3,853,725 entitled Selective Stripping Process by Roald R. Skarbo. Prior to stripping, however, the oxime is scrubbed in stage 14 in accordance with the process set forth in U.S. patent application Ser. No. 317,003.

In the preferred embodiment of the present invention, (see FIG. 2) the oxime stream leaving the primary scrub stage 14 is contacted with an ammonium sulfate solution at pH of 3–6 containing extractable metal ions to replace residual ammonia on the oxime stream with the metal from the sulfate solution. The overall reaction for ammonia stripping in accordance with the present invention is set forth below.

$$2(RH + \eta NH_3)_{(org)} + \eta MeSO_{4(aq)} \rightarrow R_2Me_{(org)} + \eta(NH_4)_2 SO_{4(aq)} \quad (5)$$

Thus, instead of using hydrogen from an acid to form the ammonium ion causing a pH increase, as is the case with prior processes, the present process utilizes the replaceable hydrogen ion in the organic to form hydrogen ions which counteracts the inevitable pH rise.

It is preferred to scrub the ammonia with a scrub stream containing a metal that is extracted by the oxime from the leach solution. Thus, if the oxime is loaded with copper or co-loaded with copper and other metals, a copper salt, in an amount equivalent to the ammonia on the oxime, is included in the scrub solution. If the oxime is loaded with nickel, then a nickel salt may be advantageously included in the scrub solution. At this point, however, it should be noted that the ammonia can be scrubbed by utilizing a stream containing any soluble metal that the oxime can extract. In the majority of cases, however, the oxime will be used to extract copper or nickel or both; therefore, it is preferable to include either copper or nickel salts in the scrub solution.

Although metal sulfates are the preferred salts, other neutral salts, or salts that will not result in a pH increase, may be dissolved in the scrub solution. Thus, nitrates, sulfites, halides, borates, etc. may be utilized. The important property for the selection of the salt is that it be soluble in the aqueous scrub solution. Metal sulfates are preferred because of their comparatively low cost and availability from electrolyte bleed streams from electrowinning circuits.

The oximes which can be scrubbed in accordance with this invention include α-hydroxy oximes, substituted hydroxy benzophenoximes, and mixtures thereof.

The α-hydroxy oxime component has the general formula

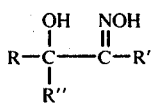

where R, R' and R'' may be any of a variety of organic hydrocarbon radicals such as aliphatic and alkylaryl radicals. R'' may also be hydrogen. Preferably, R and R' are unsaturated hydrocarbon or branched chain alkyl groups, containing from about 6 to 20 carbon atoms, R and R' are also preferably the same and, when alkyl, are preferably attached to the carbons substituted with the — OH and = NOH groups through a secondary carbon atom. It is also preferred that R'' is hydrogen or unsaturated hydrocarbon or branched chain alkyl groups containing from about 6 to 20 carbon atoms. The α-hydroxy oximes also preferably contain a total of about 14 to 40 carbon atoms. Representative compounds are 19-hydroxyhexatriaconta-9, 27-dien-18-oxime, 5-10-diethyl-8-hydroxy-tetradecan-7-oxime, and 5,8-diethyl-7-hydroxy-dodecane-6-oxime. The later compound has the following structural formula:

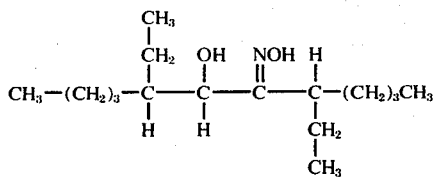

Representative of other mono- and polyunsaturated radicals are heptenyl, octenyl, decenyl, octadecenyl, octadecynyl and alkyl substituted radicals such as ethyloctadecenyl. Representative of other mono- and polyalkyl substituted saturated radicals are ethylhexyl, diethylheptyl, butyldecyl, butylhexadecyl, ethylbutyldodecyl, butylcyclohexyl and the like.

The α-hydroxy oxime component is also characterized as having a solubility of at least 2% by weight in the hydrocarbon solvent used to make up the organic phase and substantially complete insolubility in water.

The substituted benzophenoximes useful in the present invention have the following formula:

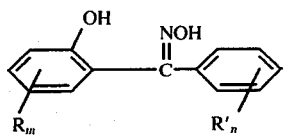

in which R and R' may be individually alike or different and are saturated aliphatic groups, ethylenically unsaturated aliphatic groups or saturated or ethylenically unsaturated aliphatic ether groups (i.e. — OH'') and $m$ and $n$ are 0, 1, 2, 3 or 4 with the proviso that $m$ and $n$ are not both 0. The total number of carbon atoms in $R_m$ and $R'_n$ is from 3–25. R and R' contain 1 to 25 carbon atoms when saturated aliphatic and 3 to 25 carbon atoms when they are ethylenically unsaturated groups. Preferably, the position ortho to the phenolic OH substituted carbon atom is unsubstituted and also preferably the positions ortho to the oxime carbon atom on the other aromatic nucleus are unsubstituted. Branched chain saturated aliphatic hydrocarbon substituents are preferred. Compounds of the above type include the following:

2-hydroxy-3' methyl-5-ethylbenzophenoxime
2-hydroxy-5-(1,1-dimethylpropyl)-benzophenoxime
2-hydroxy-5-(1,1-dimethylethyl)-benzophenoxime
2-hydroxy-5-octylbenzophenoxime
2-hydroxy-5-nonyl-benzophenoxime
2-hydroxy-5-dodecyl-benzophenoxime
2-hydroxy -2', 4'-dimethyl-5-octylbenzophenoxime
2-hydroxy-2', 3', 5'-trimethyl-5-octylbenzophenoxime
2-hydroxy-3,5-dinonylbenzophenoxime
2-hydroxy -4'-(1,1-dimethylethyl)-5-(2-pentyl)-benzophenoxime
2-hydroxy-4'-(1,1-dimethylethyl)-5-(2-butyl)-benzophenoxime
2-hydroxy-4-dodecyloxybenzophenoxime
2-hydroxy-4'-(1,1-dimethylethyl)-5-methyl-benzophenoxime
2-hydroxy-4',5-bis'(1,1-dimethylethyl)benzophenoxime The α-hydroxy aliphatic oximes can be employed in combination with 2-hydroxy benzophenoximes. The relative amounts of the two extractants in the compositions of the present invention can be varied widely with even minute quantities of the α-hydroxy aliphatic oxime being beneficial. However, it is preferred to employ it in the range of 1 to 100% by weight based on the weight of the 2-hydroxy benzophenoxime, with the best results obtainable in the range of 15–50%. The amount of the extractants in the organic solvent likewise can vary within considerable limits. In general, however, the concentration of total oxime is in the range 2–25%, based on the weight of the organic extracting solution, preferably in the range of 5–15%.

These and other suitable oximes are disclosed for example by U.S. Pat. Nos. 3,224,873; 3,592,775; 3,655,347; 3,455,680; 3,428,449; 3,276,863; and 3,197,274. The nickel and copper are introduced into the oxime to form a chelate therewith by contacting the oxime with an aqueous leach solution containing copper and nickel. Particularly suitable extractants are 2-hydroxy-4-nonylbenzophenoxime which is a primary extractant in a composition also containing an α-hydroxy oxime sold by General Mills, Inc. under the tradename LIX-64N, 5,8-diethyl-7-hydroxy-6-dodecanone oxime which is the primary extractant in a composition sold by General Mills, Inc., under the tradename, LIX-63 and 2-hydroxy-4-dodecyl-benzophenoxime which is the primary extractant in a composition also containing an α-hydroxy oxime sold by General Mills, Inc. under the tradename LIX-64.

The ion extractants used in the practice of the present invention may be employed in an inert diluent, although the use of such diluent is not critical. A wide variety of organic diluents, in which the ion extractant is dissolved, can be employed according to this invention. The minimum requirements for the diluent, however, are that the diluent be substantially water-immiscible, that it will dissolve the ion extractant, and that it will not interfere with the function of the ion extractant in extracting values from ammoniacal leach solutions. These diluents can be aliphatic or aromatic hydrocarbons, halogenated hydrocarbons, petroleum derivatives, ethers, etc. Examples of these various diluents include toluene, carbon tetra-chloride, benzene, chloroform, 2-ethyl-hexanol, and particularly kerosene.

The use of the process of the present invention as a secondary scrub for removing ammonia is illustrated in FIG. 2. Referring to FIGS. 1 and 2, a copper-nickel co-loaded oxime stream 20 is introduced into a primary scrub stage 14. The organic stream 20 is a solution of 40% by volume LIX-64N dissolved in kerosene. Organic stream 20 contains 4.1 grams per liter copper, 4.1 grams per liter nickel, and 0.9 grams per liter ammonia. The organic extractant in stream 20 is loaded with copper and nickel by contacting an ammonia-ammonium carbonate leach solution in liquid ion exchange circuit 22. A typical ammonia-ammonium carbonate leach solution would have a pH of 10.1 and contain 9.1 grams per liter nickel, 7.6 grams per liter copper, 65 grams per liter $CO_2$ and 100 grams per liter $NH_3$. During the extraction of the copper and nickel values in liquid ion exchange circuit 22, ammonia is also extracted by the oxime. At this point, it should be noted that the details for extracting copper and nickel with an oxime in circuit 22 are well known by those in this art and form no part of the invention.

The organic stream 20 containing the oxime co-loaded with copper and nickel (and also containing extracted ammonia) is sent into the primary scrub stage. For simplicity, primary scrub stage 14 is shown as a single unit in the drawing. It is preferred, however, to utilize two mixer/settler units as the primary scrub stage. Thus, the scrubbing solution 11 enters one of the mixer/settler units and exits from the other of the mixer/settler units as stream 26. Stream 11 is an aqueous solution containing 79 grams per liter of ammonium bicarbonate. In order to reduce the ammonia content on the oxime stream 20 to about .07 grams per liter with two mixer/settler units in the primary scrub stage, the organic (stream 20) to aqueous (stream 11) volumetric ratio is maintained at about 13.5. Thus, the organic stream 26 entering the secondary scrub stage 16' (see FIG. 2) contains about 0.07 grams per liter of ammonia in addition to the copper and nickel.

The secondary scrub stage 16' contains a single mixer/settler unit. The operation to be performed in the secondary scrub stage is to lower the amount of ammonia in exiting organic stream 28 to about 0.003 grams per liter. To accomplish this result with an entering organic stream 26 containing 0.07 grams per liter ammonia, the aqueous scrub solution 30 entering the single mixer/settler unit of the secondary scrub stage must contain about 0.13 grams per liter cupric ions, if the scrubbing operation is performed at O/A = 1. The actual chemical make up of the scrub solution 30 entering secondary scrub stage 16' is set forth below.
1. 100 g/l $(NH_4)_2SO_4$
2. $\approx$ 0.13 g/l $Cu^{++}$ (0.51 g/l $CuSO_4 \cdot 5H_2O$)
3. pH $\approx$ 4

For one mixer/settler unit and for an organic and aqueous having the composition of streams 26 and 30, the organic (26) to aqueous (30) volumetric ratio is one.

As a result of the contact which takes place between the scrub solution 30 and the organic stream 26 in the secondary scrub stage, cupric ions in the scrub solution are loaded onto the oxime and ammonia on the oxime enters the aqueous scrub stream 32 leaving the secondary scrub stage. The chemical composition of the exiting scrub solution (32) is set forth below.
1. 100.3 g/l $(NH_4)_2SO_4$
2. 0.0 g/l $Cu^{++}$
3. pH $\approx$ 4

Exiting scrub solution 32 is then fed into a hold up tank 34 where cupric ions in the form of copper sulfate is added to the scrub solution to bring the amount of cupric ions in the scrub solution up to 0.13 grams per liter.

If the $Cu^{++}$ ions are added to the hold up tank, the pH of the scrub solution can be maintained constant only by variation of the aqueous feed flow rate (allowing for slight variation of organic $NH_3$ concentration). However, if $Cu^{++}$ is added to the feed line to the secondary scrub stage, as is shown in FIG. 2, the flow rates can remain constant while only the $Cu^{++}$ addition rate changes slightly. Either control method is acceptable, however.

With the ammonia level of the oxime lowered to about 0.003 grams per liter, the oxime stream 28 is fed to the nickel strip circuit where, after nickel is stripped, it is fed to the copper strip circuit to be treated in the manner described above with reference to the prior art process shown in FIG. 1.

At this point, it should be noted that the equivalent amount of copper required to scrub ammonia in an oxime to a value of less than 5 mg/l is less than 3% by weight of the total recoverable copper. Furthermore, the scrubbing action is associated with approximately a 0.1 grams per liter increase in the copper content of the organic.

It is advantageous for the strip solution to contain 100 grams per liter ammonium sulfate at a pH of 3.5 – 4 when the scrub solution also contains copper. The concentration of copper sulfate is variable depending upon O/A ratio used. For example, at an O/A ratio equal to 2, the copper concentration of the scrub stream 30 is 0.26 grams per liter. A convenient source of copper is copper sulfate crystallized from a copper strip bleed stream 40.

Another important application of the present invention is to recover small amounts of metals such as nickel or copper from bleed streams from acid strip circuits, such as nickel bleed stream 42 and copper bleed stream 40. When nickel bleed streams are utilized to scrub the ammonia, the pH of the aqueous scrub solution is first allowed to rise in the manner associated with the prior art secondary ammonia scrubbing to a value at which the oxime will extract nickel from the bleed stream. That is, the feed rate of the nickel strip bleed solution is maintained such that the amount of nickel and acid is less than equivalent to the $NH_3$ to be scrubbed from the organic. This will ensure a pH rise to a value where the nickel will extract. Of course, the pH at which oximes begin to extract nickel depends on the nickel concentration of the leach solution.

One of the prior art problems associated with extracting small amounts of nickel from acid bleed streams having a pH of 6.5 is that as the extraction occurs, the pH drops to a value where the oxime is no longer capable of extracting the nickel. However, if ammonia is scrubbed from the bleed stream as the nickel is extracted, the pH remains constant. Of course, if the aqueous feed pH is 6–6.5, the amount of ammonia that is scrubbed must be equivalent to the nickel content in the bleed stream in order to insure constant pH for nickel extraction. It should be noted that the presence of nickel in the scrub solution will maintain a maximum pH in the scrub solution of approximately 6 to 6.5. Thus, as nickel extracts at these pH's, the pH remains constant by virtue of the nickel exchange reaction with the ammonia.

It should also be noted that cobalt, as well as nickel, may be recovered by the foregoing procedure. Cobalt is an acid solution readily extracts at a pH of 6 or greater. Any pH rise to 6 would also be associated with cobalt extraction, if cobalt were present.

The foregoing bleed stream aspect of the present invention is further illustrated by the following non limiting examples.

Figure 3:
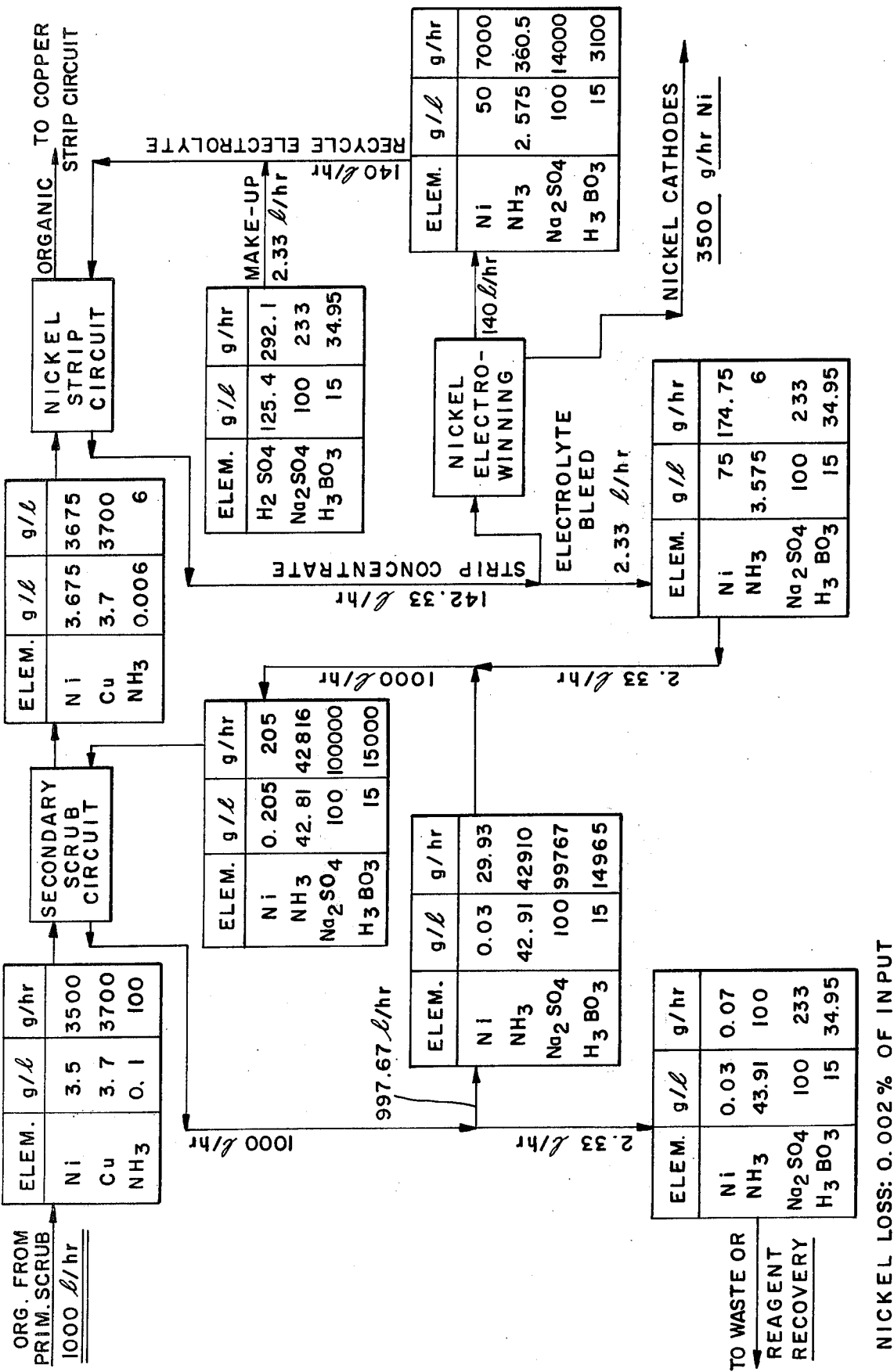
FIG. 3 is a flow chart showing material balances for an alternate embodiment of the present invention.

A one milliliter sample of a nickel strip concentrate at a pH of about 3 and containing about 75 grams per liter nickel was diluted 300 times with water to yield an aqueous solution at a pH of 6.6 containing 0.25 grams per liter nickel. A 50 ml sample of the foregoing aqueous solution was then contacted with 50 ml of organic similar to that leaving primary scrub stage 14, i.e. stream 26. After contacting the oxime stream, the pH of the aqueous solution had decreased from 6.6 to 5.5 because an amount of nickel in excess of the ammonia content of the organic had been extracted. Chemical analysis revealed the following:

Nickel content of the aqueous after contacting; 0.029 g/l $NH_3$ content of organic after contacting; 0.006 g/l A combined scrub and nickel recovery step including a nickel bleed stream is illustrated in FIG. 3. It should be noted that the solution required for the electrolyte make up contains 125.4 grams per liter $H_2SO_4$. Obviously, bleed solutions from the copper strip circuit can be used for this purpose. Thus, the present invention can be utilized to extract both copper and nickel from bleed streams while scrubbing ammonia. The foregoing is advantageously accomplished by contacting the oxime with an acid bleed stream containing copper and nickel. Prior to contacting the oxime, the pH of the acid bleed stream is adjusted to a value between the range of 5.5 to 6. Under these conditions, the amount of ammonia scrubbed from the oxime would be equivalent to the copper and nickel content in the bleed stream.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A method for scrubbing extracted ammonia from metal bearing oximes in processes in which oximes are utilized to extract metals from ammoniacal leach liquors by solvent extraction comprising contacting the oxime to be scrubbed with an aqueous scrub solution containing a soluble metal that the oxime to be scrubbed can extract, the amount of the metal in the scrub solution being equivalent to the amount of ammonia to be scrubbed from the oxime, said contacting of the oxime with the scrub solution containing the metal eliminating the pH rise of the aqueous scrub liquor associated with acid scrubbing of ammonia from oximes into which ammonia has been extracted.

2. The method as set forth in claim 1 wherein the method is employed as a secondary scrub prior to acid stripping of the metal values loaded on the oxime and the metal in the scrub solution is in the form of a soluble metal salt.

3. The method as set forth in claim 2 wherein the metal portion of the salt in the scrub solution is a metal that has been extracted onto the oxime from said ammoniacal leach liquor.

4. The method as set forth in claim 2 wherein the metallic portion of said salt in said scrub solution is a metal selected from the group consisting of copper and nickel.

5. The method as set forth in claim 3 wherein said salt is a salt that will not result in a pH increase in the aqueous scrub solution.

6. The method as set forth in claim 4 wherein said salt is a member of the group consisting of sulfates, nitrates, borates and halides.

7. The method as set forth in claim 2 wherein said salt in said scrub solution is a salt selected from the group consisting of copper sulfate and nickel sulfate.

8. The method as set forth in claim 2 wherein said scrub solution contains ammonium sulfate and wherein said metal salt is copper sulfate.

9. The method as set forth in claim 8 wherein said aqueous scrub solution contains 100 g/l of ammonium sulfate and is at a pH of 3.5 – 4.

10. The method as set forth in claim 2 wherein said salt is crystallized from a bleed stream from an acid stripping circuit.

11. The method as set forth in claim 2 wherein said scrub solution contains copper sulfate which has been crystallized from a copper strip bleed stream.

12. The method as set forth in claim 2 wherein said scrub solution contains a nickel salt which has been crystallized from a nickel strip bleed stream.

13. A method for recovering metals from metal acid bleed streams containing metal values by utilizing said bleed streams as an aqueous scrub solution to scrub ammonia from metal bearing oximes containing extracted ammonia in processes in which leached metals are recovered from ammoniacal leach liquors by solvent extraction with oximes comprising the following steps:

a. adjusting the pH of the bleed stream to serve as the aqueous scrub solution for the ammonia on the oxime to be scrubbed to a value at which the oxime to be scrubbed will extract metal values present in the bleed stream;

b. contacting the oximes with the acid bleed stream containing metal values which will replace the ammonia on the oxime; and, c. maintaining the feed rate of the acid bleed stream so that the amount of extractable metal values and acid in the bleed stream is equivalent to the amount of ammonia to be scrubbed from the oxime, said contacting of the oxime with the bleed stream scrubbing ammonia from the oxime and preventing the pH of the bleed stream scrub solution to drop to a value below which the oxime will not extract the metal from the bleed stream which replaces the ammonia on the oxime.

14. The method as set forth in claim 13 wherein the bleed stream contains a metal selected from the group consisting of nickel, cobalt and mixtures thereof and wherein said pH of the bleed stream to serve as the aqueous scrub solution for the ammonia is allowed to rise to a value of about 6.

15. The method as set forth in claim 13 wherein the bleed stream contains nickel, the pH of the bleed stream to serve as the aqueous scrub solution for the ammonia is adjusted in step (a) to a value of about 5.5 to 6, and the amount of ammonia scrubbed from the oxime is equivalent to the nickel content in the bleed stream.

16. The method as set forth in claim 13 wherein the bleed stream contains copper and nickel, the pH of the bleed stream to serve as the aqueous scrub solution for the ammonia is adjusted in step (a) to a value of about 5.5 to 6, and the amount of ammonia scrubbed from the oxime is equivalent to the copper and nickel content in the bleed stream.

* * * * *